(12) United States Patent
Felix et al.

(10) Patent No.: US 12,729,065 B2
(45) Date of Patent: Sep. 8, 2026

(54) DOOR ARRANGEMENT COMPRISING A TRANSFER CHUTE HAVING TWO ROTATION AXES

(71) Applicant: ABC TRANSFER, Tours (FR)

(72) Inventors: Julien Felix, Tours (FR); Jean-Luc Schneider, Sligo (FR); Thierry Girard, Tours (FR)

(73) Assignee: ABC Transfer, Tours (FR)

( * ) Notice: Subject to any disclaimer, the term of this patent is extended or adjusted under 35 U.S.C. 154(b) by 265 days.

(21) Appl. No.: 17/787,426

(22) PCT Filed: Dec. 17, 2020

(86) PCT No.: PCT/FR2020/052500
§ 371 (c)(1),
(2) Date: Jun. 20, 2022

(87) PCT Pub. No.: WO2021/123638
PCT Pub. Date: Jun. 24, 2021

(65) Prior Publication Data

US 2023/0035472 A1 Feb. 2, 2023

(30) Foreign Application Priority Data

Dec. 20, 2019 (FR) ...................................... 1915377

(51) Int. Cl.
*B65G 11/12* (2006.01)
*E05D 7/00* (2006.01)
(Continued)

(52) U.S. Cl.
CPC ................. *B65G 11/12* (2013.01); *B01L 1/00* (2013.01); *E05Y 2201/43* (2013.01)

(58) Field of Classification Search
CPC . B65G 11/12; B01L 1/00; G21F 7/005; G21F 7/047; B25J 21/02
(Continued)

(56) References Cited

U.S. PATENT DOCUMENTS 2,178,908 A * 11/1939 John .......................... E05D 3/10 16/367
3,774,741 A 11/1973 Johnson
(Continued)

FOREIGN PATENT DOCUMENTS

CN 201364030 11/2018
CN 110577061 12/2019
(Continued)

OTHER PUBLICATIONS

International Search Report for parent PCT application (PCT/FR2020/052500), mailed Apr. 1, 2021.
(Continued)

*Primary Examiner* — Kenneth Rinehart
*Assistant Examiner* — Stephanie A Shrieves
(74) *Attorney, Agent, or Firm* — Falcon Rappaport & Berkman LLP

(57) ABSTRACT

The invention relates to a door arrangement (1) for a door with a first enclosed volume, the arrangement permitting a sealed connection between the first enclosed volume and a second enclosed volume, and comprising a flange (2) defining passage opening and a passage axis (O) perpendicular to the opening plane, a door (4) pivotably mounted on the flange (2) and a chute for discharging (10) components which is movable between a discharge position in which the chute is positioned opposite the passage opening and a position in which the chute is spaced apart from the passage opening, the chute being attached to the flange (2) by means of a first double-jointed link mechanism (11) comprising a
(Continued)

first link (12) arranged to permit a rotational movement about an axis (C) parallel to the passage axis (O) of the passage opening and a second link (13) arranged to permit a rotational movement about an axis (D) perpendicular to the passage axis (O) of the passage opening.

10 Claims, 2 Drawing Sheets

(51) Int. Cl.
*E05F 15/00* (2015.01)
*B01L 1/00* (2006.01)

(58) Field of Classification Search
USPC ............................................. 141/98, 87, 342
See application file for complete search history.

(56) References Cited

U.S. PATENT DOCUMENTS 5,460,439 A * 10/1995 Jennrich .................. B01L 1/02 312/1
5,853,207 A * 12/1998 Saint Martin ........... G21F 7/005 292/257
7,007,346 B2 * 3/2006 Hoffman ............... E05F 1/1058 296/146.12
7,396,068 B1 * 7/2008 McRobert ................ B60J 5/047 49/248
7,770,960 B2 * 8/2010 Greenbank ............ B60J 5/0472 296/146.12
7,779,510 B2 * 8/2010 Hoffman ................. E05D 11/06 296/146.12
8,950,624 B2 * 2/2015 Sacca ...................... G21F 7/005 220/825
9,168,520 B2 * 10/2015 Armau ..................... F16J 13/18
9,754,691 B2 * 9/2017 Dufour ..................... B01L 1/02
10,722,892 B2 * 7/2020 Eccles ....................... B01L 1/02
12,320,188 B2 * 6/2025 Felix ......................... E06B 5/00
2007/0074784 A1 * 4/2007 Giesen ................ B65G 69/183 141/346
2013/0167442 A1 7/2013 Sacca
2018/0333725 A1 11/2018 Eccles et al.
2019/0378630 A1 * 12/2019 Aubert ....................... B25J 1/08
2024/0269871 A1 * 8/2024 Mottier .................... B25J 21/02

FOREIGN PATENT DOCUMENTS

FR 2777822 10/1999
FR 3036054 11/2016
FR 3082126 12/2019

OTHER PUBLICATIONS

Office action from Chinese counterpart application (202080088447.2), issued Nov. 26, 2024 (and English translation).

* cited by examiner 1
2
4
200
10
C
O
A
7
5
6
D
B
13
12
9
11
100

3
4
10
6
9

2
4
12
10
7
6
13

DOOR ARRANGEMENT COMPRISING A TRANSFER CHUTE HAVING TWO ROTATION AXES

CROSS REFERENCE TO RELATED APPLICATION

This application is a U.S. National Phase of International Application No. PCT/FR2020/052500 filed Dec. 17, 2020, which claims priority to French Patent Application No. FR1915377, filed Dec. 20, 2019, both of which are incorporated by reference herein in their entirety.

TECHNICAL FIELD OF THE INVENTION

The present invention relates to a door arrangement for a first enclosed volume allowing a sealed connection between said first enclosed volume and a second enclosed volume.

The present invention relates more particularly to a door arrangement for a first enclosed volume comprising a flange arranged to define a passage opening, defining an axis, in the first enclosed volume, a door pivotably mounted on the flange so as to pass from a closed position in which the door closes the passage opening, and an open position, and a chute for discharging components, movable between a discharge position in which the chute is positioned facing the passage opening to receive and pour the components from the second enclosed volume into the first enclosed volume when the second enclosed volume is connected to the first enclosed volume and a position spaced apart from the passage opening.

In the present application, “volume” means any product, equipment or installation delimiting a volume. Thus, it can be an enclosure, an insulator, a receptacle, a container, a bag, etc.

Enclosed volume is understood to mean a volume isolated from the external environment. This may be in particular, but not exclusively, a volume for preparing, storing and/or handling products that must not be in contact with the outside or with a user.

The door arrangement according to the invention is intended in particular, but not exclusively, to connect two enclosed volumes in order to transfer products from one volume to the other without breaking the containment. This may include, for example, the transfer of hazardous products such as certain biological, chemical or radioactive products, the transfer of components such as stoppers, vials, plungers, syringes, etc., the transfer of environmental control devices such as culture medium plates, particle counters, etc., the transfer of cleaning systems, the transfer of liquids, powders, tools, the transfer of waste to the outside of the enclosure and/or the transfer of any element necessary to production or maintenance of the production line.

PRIOR ART

The transfer of products from one enclosed volume to another without breaking the containment of these volumes is a difficult problem to solve. To respond to this problem, double-door sealed connection devices have been developed. This includes, for example, those described in patent applications FR2777822 and FR3036054.

These double-door connection devices are formed by a first and a second door/flange assembly, one of the door/flange assemblies being that of one of the volumes, the other door/flange assembly being that of the other volume. Conventionally, the enclosed volume to be connected is a receptacle of the transportable container or pouch type, while the other enclosed volume to which the receptacle is connected is generally a fixed handling enclosure. The receptacle is connected to the handling enclosure by connecting the door/flange assemblies together. This connection is generally made by engaging what is referred to as a bayonet system, the male lugs of the flange and the door of the receptacle engaging, respectively, in notches of the flange and the door of the handling enclosure—followed by a rotation of the receptacle that allows the flange of the receptacle to be locked to the flange of the handling enclosure, as well as allowing the door of the receptacle to be locked to the door of the enclosure, the doors connected to one another being unlocked by unlocking the doors from the respective flanges thereof.

In order to facilitate the transfer of the components from the second enclosed volume to the first enclosed volume, it is known to use a transfer device fixed inside the enclosure, on the wall of the latter. Usually, the transfer device comprises a funnel-forming element that is positioned by bearing or in the flange of said first volume to receive the components coming from the second volume and to guide them within the first volume. Patent application FR3082126 describes an example of a transfer device.

The transfer devices of the prior art, however, have the drawback of generating turbulence under the laminar flow during their movement within the enclosure to pass from their discharge position to the position spaced apart from the passage opening and vice versa. However, the turbulence generated breaks the intangible protection barrier of the process created by the laminar flow and therefore generates a risk of contamination of the process.

Furthermore, the transfer devices of the prior art are relatively bulky.

The invention aims to remedy these problems by proposing a door arrangement facilitating the transfer of components from one enclosed volume to another while minimizing turbulence under laminar flow and an enclosure comprising such a door arrangement.

Another object of the invention is to provide an arrangement and an enclosure comprising such a door arrangement comprising a component transfer device that is simple to implement and easily cleanable and that offers optimum space requirements.

SUBJECT MATTER OF THE INVENTION

To this end, and according to a first aspect, the invention proposes a door arrangement for a first enclosed volume allowing a sealed connection between said first enclosed volume and a second enclosed volume, comprising a flange arranged to define a passage opening, defining a passage axis, in the first enclosed volume, a door pivotably mounted on the flange so as to pass between a closed position in which the door closes the passage opening, and an open position, and a chute for discharging components, movable between a discharge position in which the chute is positioned facing the passage opening to receive and pour the components coming from the second enclosed volume into the first enclosed volume when the second enclosed volume is connected to the first enclosed volume, and a position spaced apart from the passage opening. The arrangement is remarkable in that the discharge chute is fixed to the flange by means of a first double-jointed link mechanism comprising a first joint arranged to allow rotational movement about an axis parallel to the passage axis of the passage opening and a second joint arranged to allow rotational movement about an axis perpendicular to the passage axis of the passage opening.

"Passage axis" means the axis perpendicular to the opening plane defined by the passage opening.

Advantageously, the first double-jointed link mechanism is driven by a micromotor.

Advantageously, the door arrangement comprises means for controlling the micromotor to move the discharge chute from its spaced apart position to its discharge position by driving the first joint, then the second joint, and vice versa to move the discharge chute from its discharge position from to its spaced apart position.

Advantageously, the discharge chute has a half-truncated cone profile.

Advantageously, the door is fixed to the flange by means of a second double-jointed link mechanism comprising a first joint arranged to allow rotational movement about an axis perpendicular to the passage axis of at most 30 degrees relative to the plane of the passage opening and a second joint arranged to allow rotational movement about an axis parallel to the passage axis.

Advantageously, the first double-jointed link mechanism is diametrically opposed to the second double-jointed link mechanism.

Advantageously, the second joint of the second double-jointed link mechanism is arranged to allow a rotational movement of at least a quarter turn.

Advantageously, the second joint of the second double-jointed link mechanism is arranged to allow a rotational movement of preferably 180 degrees with respect to the plane of the passage opening.

Advantageously, the double-jointed link mechanism is motorized.

BRIEF DESCRIPTION OF THE DRAWINGS

Other features and advantages of the invention will become apparent from the following detailed description of the invention with reference to the appended figures, in which.

Figures 1, 2, 3:
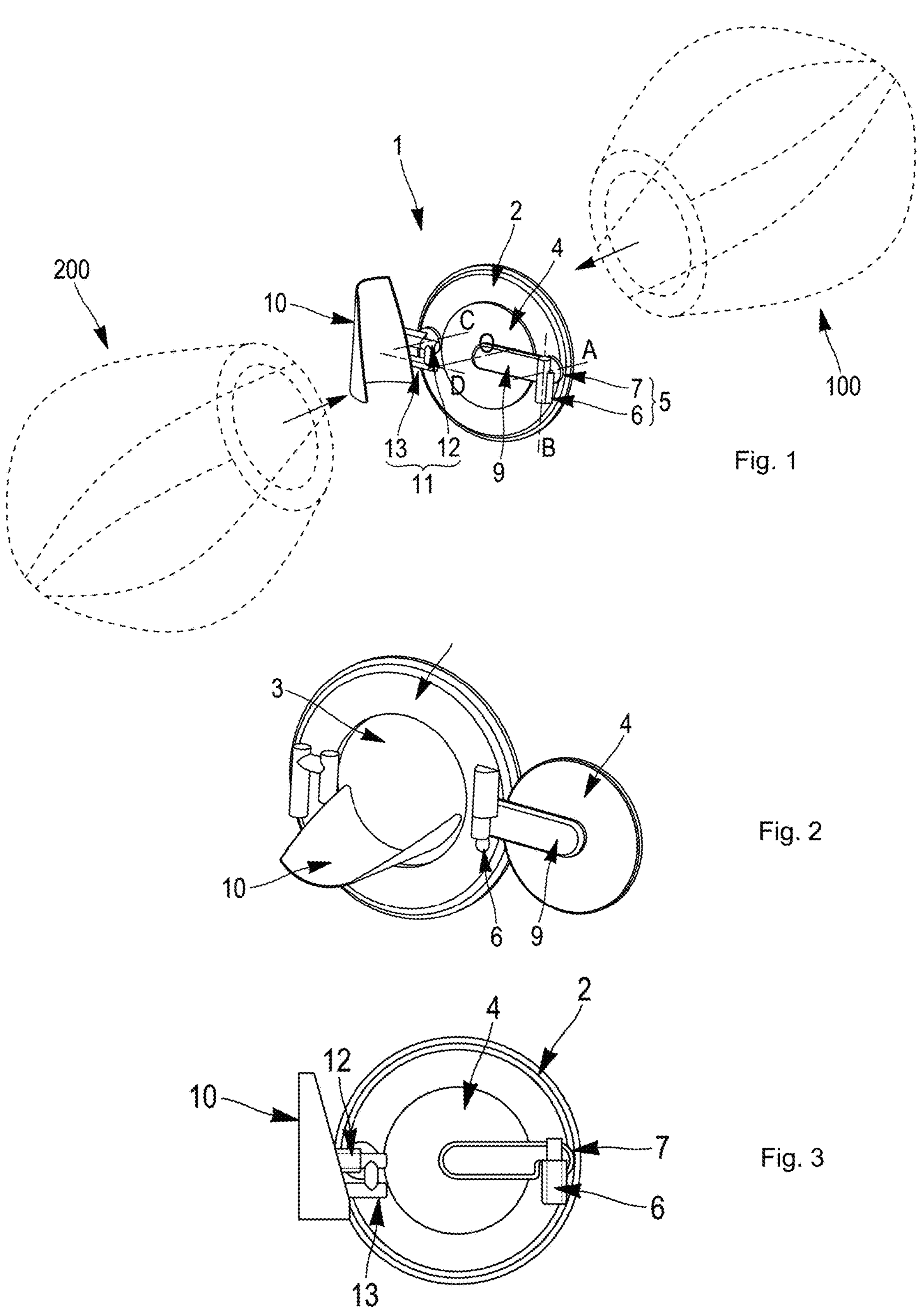
FIG. 1 shows a perspective view of the rear of a door arrangement according to the invention, the door being in the closed position.
FIG. 2 shows a front view of the door arrangement of FIG. 1, with the door in position and the discharge chute in the discharge position.
FIG. 3 shows a front view of the door arrangement of FIG. 1, in the closed position.

In the following, the term "rear view" means the view that is in or directed toward the inside space of the enclosed volume defined by the door arrangement. Similarly, the term "front view" means that which is located outside the inside space of the enclosed volume or directed away from the inside of the enclosed volume defined by the door arrangement.

DETAILED DESCRIPTION OF THE INVENTION

In connection with FIGS. 1 to 6, there is described a door arrangement 1 equipping a first enclosed volume (100). This door arrangement is arranged to allow the connection of a second enclosed volume (200). Advantageously, the first enclosed volume (100) is a fixed enclosure while the second enclosed volume (200) is a transportable container. This is of course one embodiment, the device according to the invention not being limited to this type of enclosed volumes. When the door arrangement of the first volume (100) and the door arrangement of the second volume (200) are connected to each other, they form a sealed function device allowing the transfer of products between the two enclosed volumes, without breach of containment.

The door arrangement 1 comprises a flange 2, a door 4 and a chute 10 for discharging components.

The flange 2 is arranged to define a passage opening 3 in the enclosure provided with the door arrangement 1, the passage opening 3 defining an opening plane and a passage axis O perpendicular to the opening plane. The door 4 is pivotably mounted on the flange 2 so as to pass from a closed position in which the door 4 closes the passage opening 3 to an open position in which the door 4 extends substantially parallel to the opening plane passage, and vice versa. The discharge chute 10 is arranged inside the first volume 1 to allow the discharge of components from the second enclosed volume into the first enclosed volume when the second enclosed volume is connected to the first enclosed volume.

According to the invention, the discharge chute 10 is pivotably mounted on the flange 2 so as to pass between a discharge position in which the discharge chute 10 is positioned facing the passage opening 3 to receive and discharge the components coming from the second enclosed volume and a position spaced apart from the passage opening 3. To do this, the discharge chute 10 is fixed to the flange 2 via a double-jointed link mechanism 11. The latter thus comprises a first joint 12 arranged to allow a rotational movement about an axis C parallel to the passage axis O of the passage opening and a second joint 13 arranged to allow a rotational movement about an axis D perpendicular to the passage axis O of the passage opening.

Advantageously, the double-jointed link mechanism 11 is arranged so that the displacement of the discharge chute 10 from its spaced apart position to its discharge position takes place firstly following the rotational movement about the axis C, then secondly following the rotational movement about the axis D, and vice versa to pass from its discharge position to its spaced apart position.

According to a particularly advantageous embodiment, the double-jointed link mechanism 11 is driven by a micromotor. The latter is advantageously controlled to move the discharge chute from its spaced apart position to its discharge position according to the successive rotational movements described above. It is of course obvious that the invention is not limited to a motorized discharge chute, the movement of the latter being able to be carried out manually by accessing the first enclosed volume via a secondary opening of the first volume.

The discharge chute 10 advantageously has a half-truncated cone profile, the large base of which is intended to engage in the passage opening 3 when the discharge chute 10 is in the discharge position, the small base defining the discharge end in the first volume. In the illustrated embodiment, the discharge chute 10, positioned at the median flange 2 level, extends vertically near the wall of the enclosure, the discharge end being directed toward the top of the enclosure. It is of course obvious that the invention is not limited to such an arrangement of the discharge chute, the latter being able to be arranged on the flange at a location other than that illustrated and a motorized door, or to have another orientation without departing from the scope of the invention.

Like the discharge chute 10, the door 4 is also advantageously fixed to the flange 2 by means of a double-jointed link mechanism 5. In the illustrated example, this second double-jointed link mechanism 5 is diametrically opposed to the first double-jointed link mechanism 11.

The second double-jointed link mechanism 5 comprises a first joint 6 arranged to allow rotational movement about an axis B perpendicular to the axis of the door (or to the passage axis O of the passage opening) on the one hand and a second joint 7 arranged to allow a rotational movement about an axis A parallel to the axis of the door on the other hand (or to the passage axis O of the passage opening). In the present description, the term "axis of the door" denotes the axis that extends perpendicularly to the door when the latter is in the closed position. The axis of the door therefore corresponds to the passage axis O. Advantageously, the two joints 6 and 7 are arranged with the door 4 so that the opening of the door takes place firstly following the rotational movement about the axis B, then secondly following the rotational movement about the axis A. The first joint 6 is in the form of a hinge, the fixed part of which is secured to the second joint 7, which in turn is coupled to the door by a connection arm 9. The first joint 6 is arranged to allow a rotational movement of at most 30 degrees relative to the opening plane, while the second joint 7 is arranged to allow a rotational movement of at least 45 degrees, and preferably 180 degrees relative to the opening plane.

It is of course obvious that the invention is not limited to a door fixed to the flange by a double joint, and that a door opening can be provided with another mechanism without departing from the scope of the invention, such as for example a single hinge. The advantage of providing a double-jointed mechanism, whether for the discharge chute or the door, is to avoid the formation of turbulent flows when they move from one position to another.

According to an advantageous embodiment, the door is advantageously motorized. To do this, the first and second joints 6 are each coupled to a motor of the stepper type, for example. It is of course obvious that the invention is not limited to a motorized door, the movement of the latter being able to be carried out manually by actuating a control lever carried by the door, this control lever being able to be provided on the interior side and/or exterior side of the enclosed volume.

FIG. 2 to 6 illustrate the placement of the discharge chute 10 in its discharge position.

Thus, prior to installing the discharge chute in front of the passage opening 3, the door is opened. This takes place, from its closed position (FIG. 2), by rotation about the axis B of the hinge (first joint 6) following a stroke of approximately 20 degrees in the example illustrated, followed by a rotational movement about the axis A of the second joint 7 over a stroke of approximately 180 degrees to reach the final open position illustrated in FIG. 3. In its final open position, the door 4 extends in a plane parallel to the plane of the passage opening, diametrically opposed to its closed position.

Figure 4:
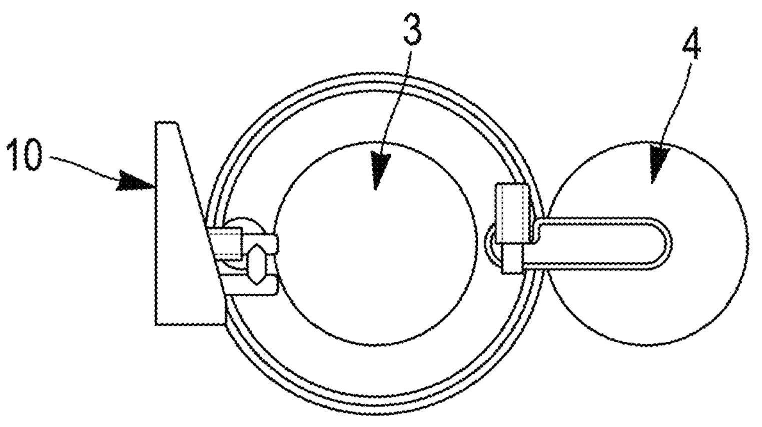
FIG. 4 shows a front view of the door arrangement of FIG. 1, the door being in the fully open position, the discharge chute being positioned in front of the passage opening.
Figure 5:
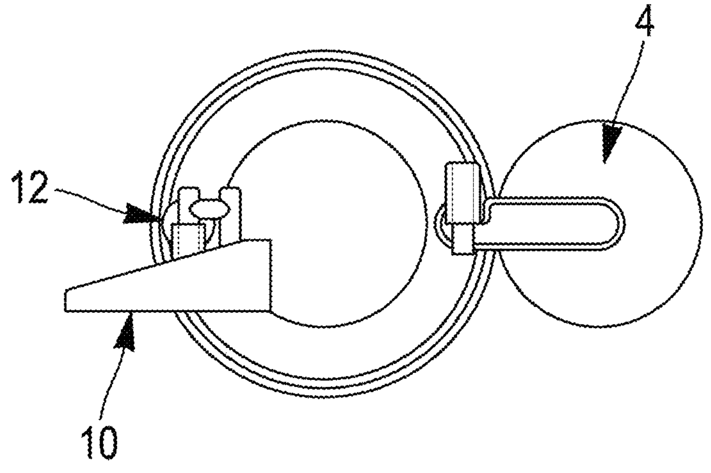
FIG. 5 shows a front view of the door arrangement of FIG. 1, the discharge chute being in an intermediate fully open position.
Figure 6:
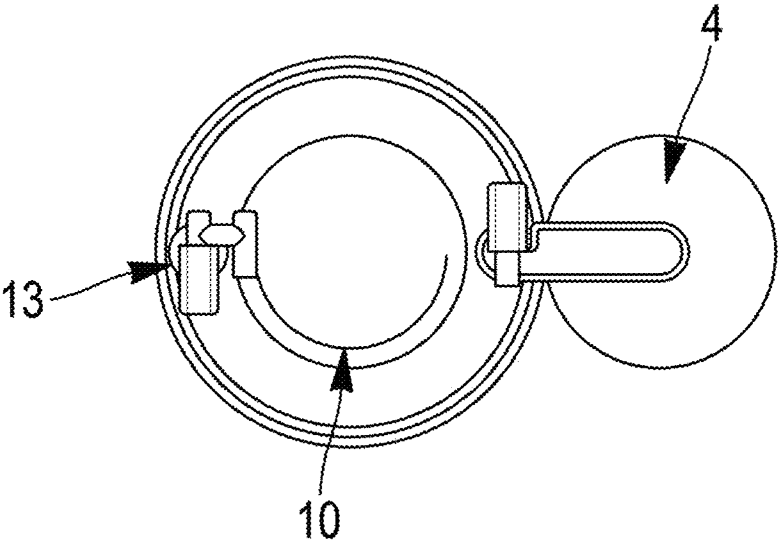
FIG. 6 shows a front view of the door arrangement of FIG. 1, the discharge chute being in an intermediate fully open position.

Once the door is fully open, the discharge chute 10 is then moved. This takes place, from its spaced apart position (FIG. 3), by rotation about the axis C (first joint 12) following a stroke of 90 degrees in the illustrated example (FIG. 4). The discharge chute 10 is then moved in rotation about the axis D along a stroke of 90 degrees to reach the discharge position in FIG. 5, passing through intermediate opening positions offering complete clearance of the passage opening 3.

The invention is described in the foregoing by way of example. It is understood that a person skilled in the art is in a position to produce various variant embodiments of the invention without thereby departing from the scope of the invention.

The invention claimed is:

1. A door arrangement for a first enclosed volume allowing a sealed connection between said first enclosed volume and a second enclosed volume, comprising:

a flange arranged to define a passage opening, defining an opening plane and a passage axis perpendicular to the opening plane, in the first enclosed volume, a door pivotably mounted on the flange so as to pass from a closed position in which the door closes the passage opening to an open position, and a chute for discharging components, movable between a discharge position in which the chute is positioned facing the passage opening to receive and pour the components from the second enclosed volume into the first enclosed volume when the second enclosed volume is connected to the first enclosed volume and a position spaced apart from the passage opening, characterized in that the discharge chute is fixed to the flange by means of a first double-jointed link mechanism comprising a first joint arranged to allow rotational movement about an axis parallel to the passage axis of the passage opening and a second joint arranged to allow rotational movement about an axis perpendicular to the passage axis of the passage opening; and characterized in that the discharge chute is displaced from its spaced apart position to its discharge position by driving the first joint, then the second joint, and vice versa to move the discharge chute from its discharge position from to its spaced apart position.

2. The door arrangement according to claim 1, characterized in that the discharge chute has a half-truncated cone profile.

3. The door arrangement according to claim 1, characterized in that the door is fixed to the flange by means of a second double-jointed link mechanism comprising a first joint arranged to allow rotational movement about an axis perpendicular to the passage axis of at most 30 degrees relative to the plane of the passage opening and a second joint arranged to allow rotational movement about an axis parallel to the passage axis.

4. The door arrangement according to claim 3, characterized in that the first double-jointed link mechanism is diametrically opposed to the second double-jointed link mechanism.

5. The door arrangement according to claim 4, characterized in that the second joint of the second double-jointed link mechanism is arranged to allow a rotational movement of at least a quarter turn.

6. The door arrangement according to claim 5, characterized in that the second joint of the second double-jointed link mechanism is arranged to allow a rotational movement of up to 180 degrees with respect to the plane of the passage opening.

7. The door arrangement according to claim 4, characterized in that the second joint of the second double-jointed link mechanism is arranged to allow a rotational movement of up to 180 degrees with respect to the plane of the passage opening.

8. The door arrangement according to claim 3, characterized in that the second joint of the second double-jointed link mechanism is arranged to allow a rotational movement of at least a quarter turn.

9. The door arrangement according to claim 8, characterized in that the second joint of the second double-jointed link mechanism is arranged to allow a rotational movement of up to 180 degrees with respect to the plane of the passage opening.

10. The door arrangement according to claim 3, characterized in that the second joint of the second double-jointed link mechanism is arranged to allow a rotational movement of up to 180 degrees with respect to the plane of the passage opening.

* * * * *